Patented June 29, 1937

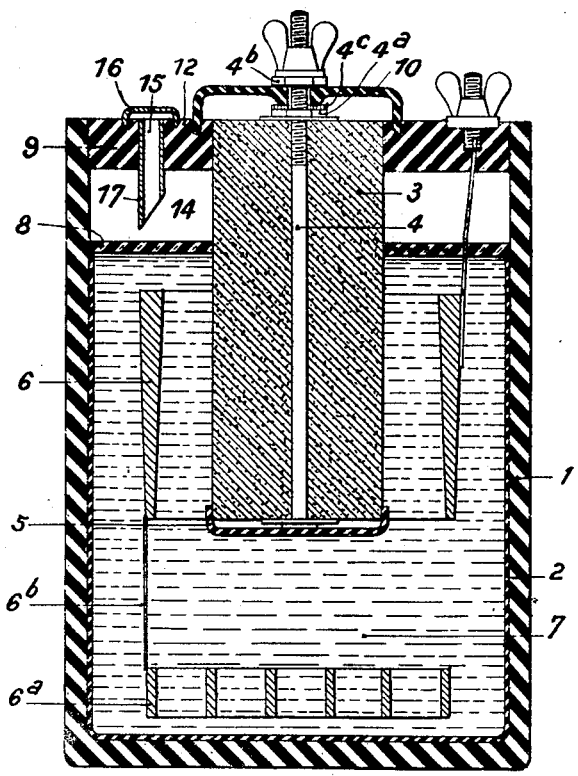

2,085,269

UNITED STATES PATENT OFFICE 2,085,269

ALKALI PRIMARY CELL WITH DEPOLARIZATION BY AIR

René Oppenheim, Gennevilliers, France, assignor to Societe Anonyme le Carbone, Gennevilliers, (Seine) France Application February 7, 1935, Serial No. 5,469
In France January 10, 1935

1 Claim. (Cl. 136—86)

This invention relates to alkali primary cells in which the depolarization is ensured through the medium of a very porous body, made for instance of porous carbon, activated or not.

For preserving the depolarizing activity of these porous bodies, it is necessary to protect them against the noxious action of certain gases, such as carbon monoxide, against the access of liquids, and, in particular, to avoid accidental contact of fatty bodies or fatty liquids. Special precautions must therefore be taken for the transport and storage of these elements.

On the other hand the output of these elements depends on the suitable aeration of the depolarizing electrode. This aeration must therefore be effected in such a manner that air is surely admitted and in sufficient quantity.

The present invention is adapted to provide a simple and economical solution of this double problem. It substantially consists in protecting the portion of the positive electrode which emerges from the cover, by means of a fluid-tight cap, but in which apertures can be instantaneously formed at the time the cell is to be used, and in providing in the cover one or more orifices allowing to put in communication with the atmosphere the portion of the depolarizing electrode comprised between the electrolyte and the cover.

In order that the invention may be more clearly understood, the accompanying drawing illustrates, by way of example only a form of carrying said invention into practice.

Fig. 1 is a vertical section of a primary cell according to the invention;

Fig. 2 is a plan view of the cap serving to protect the depolarizing electrode;

Fig. 3 is an elevation, partly in section, of the same cap.

As illustrated in the drawing, the new primary cell comprises a vessel 1, made of a suitable insulating material which is not attacked by the electrolyte, for instance, a moulded material, and which, if need be, can be internally coated with an unattackable layer 2, of paraffin for instance.

3 designates the porous depolarizing electrode, constituted for instance by an agglomerate of porous depolarizing carbon treated by a known process in order to be practically impervious to the electrolyte, while remaining pervious to gases. This porous electrode is provided with a tapping or rod 4 and its lower part can be protected against the action of the electrolyte by an insulating covering 5.

The soluble electrode 6 can be constituted by a zinc member of suitable shape, which can be simple or multiple as described in the pending United States Patent filed on April 4, 1934, under Serial No. 718,981.

In the example illustrated, the main electrode 6 is connected, by a conductor 6b, to an auxiliary soluble electrode 6a constituted by a zinc spiral arranged at the bottom of the vessel.

7 designates the alkali electrolyte, solid or not, constituted for instance by a solution of caustic soda to which mineral salts are added or not.

This electrolyte is preferably covered with a thin layer 8 of insulating material impervious to air, such as paraffin, or a plastic mass adhering to the vessel and to the depolarizing electrode, and constituted by a mixture of pitch, oxidized oil and resin.

The cell is closed by a layer of pitch or wax 9 through which passes the depolarizing electrode 3.

According to the invention, the electrode 3 is covered by a cap 10 adapted to insulate this electrode during storage. This cap is slightly larger than the said electrode, so as not to be in contact with the same.

It is made of an insulating material which is not attacked by alkali vapours and is impervious to air and to liquids. It can, for instance, be made of a moulded material. It is provided at its center with an orifice 11 (Figs. 2 and 3) for the passage of the central rod 4 of the depolarizing electrode, and is clamped between two nuts 4a and 4b (Fig. 1), carried by this rod, and preferably with interposition of a plastic washer 4c for ensuring fluid-tightness.

The edge 12 (Fig. 3) is embedded in the wax layer 9 (Fig. 1) so that the joint should be as fluid-tight as possible. This edge will preferably be notched, as shown in Fig. 3, so that the wax may easily flow into the interior and settle at the level $x\,y$, higher than the bottom of the notches.

Finally, this cap is so constructed as to present thin portions of any shape whatever, such as 13. These thin portions can be easily perforated by means of any tool: penknife, screwdriver, etc., in order to ensure, at the time the cell is to be used, a suitable aeration of the upper part of the depolarizing electrode.

Instead of these thin portions 13, the cap might be provided with any other suitable means allowing to instantaneously open apertures when the cell is to be used, for instance tongues which can be raised.

In order to further increase the aeration of the depolarizing electrode and eventually allowing the evolution of the gases produced during the operation of the cell, it is advantageous to put in communication with the atmosphere the chamber 14 comprised between the closing layer 9 and the layer 8. For that purpose, one or more orifices such as 15 are provided in the wax 9. For preventing the access of noxious fluids into the chamber of respiration 14 during storage of the cell, the orifices such as 15 are obturated by any means whatever, either a plug, or a cap easily perforable or removable, such as 16.

Finally, when the layer 8 is plastic, it may happen that the gases produced during the operation of the cell, cause said layer to swell and to obturate the orifice or orifices 15. For avoiding this inconvenience, in each of these orifices is fitted a tube 17, made of a suitable material and cut on a bevel so that the aeration of the chamber 14 may be ensured in all circumstances.

The above arrangements are given, of course, by way of example only; all the details of construction, shapes, dimensions and materials used may be varied according to circumstances, without departing thereby from the principle of the invention.

What I claim as my invention and desire to secure by Letters Patent is:—

In an alkali primary cell with depolarization by air having a plastic mass covering the electrolyte, means for closing the vessel containing the cell, a depolarizing electrode not covered by these closing means, a fluid-tight cap for protecting, before using the cell, the portion of this electrode which must be in contact with the air, means for creating in the cap means of access for the air at the time the cell is to be used, orifices in the closing means, means for obturating these orifices before using the cell, tubes in said orifices, these tubes having their lower part cut on a bevel so that they cannot be obturated by the material covering the electrolyte.

RENÉ OPPENHEIM.